April 12, 1932.   J. E. WOOD   1,853,592
VEHICLE SPRING CONSTRUCTION

Filed Feb. 25, 1928

INVENTOR
J. E. WOOD
BY *Munn & Co.*
ATTORNEYS

Patented Apr. 12, 1932

1,853,592

UNITED STATES PATENT OFFICE

JOSEPH E. WOOD, OF CHICAGO, ILLINOIS, ASSIGNOR OF ONE-HALF TO WALTER A. SCOTT, OF CHICAGO, ILLINOIS

VEHICLE SPRING CONSTRUCTION

Application filed February 25, 1928. Serial No. 256,932.

My invention relates to improvements in vehicle spring constructions, and it consists in the combinations, constructions, and arrangements herein described and claimed.

An object of my invention is to provide a vehicle spring construction which is readily adapted to be applied to a vehicle, and by means of which the frame of the vehicle may be positioned relatively close to the axles thereof, thereby preventing tilting of the frame with respect to the axles.

A further object of my invention is to provide a device of the type described which has positive means for allowing the body of the vehicle to move only in a vertical path.

A further object of my invention is to provide a device of the type described which obviates the need of shock absorbers.

A further object of my invention is to provide a device of the type described which permits the axle to move out of vertical alignment with respect to its normal position to compensate for longitudinal tension.

A further object of my invention is to provide a device of the type described in which pressure is equalized on all springs in the movement of the device in all directions, and in which novel means is provided for varying the tension of the springs.

Other objects and advantages will appear in the following specification, and the novel features of the invention will be particularly pointed out in the appended claims.

Figure 1:
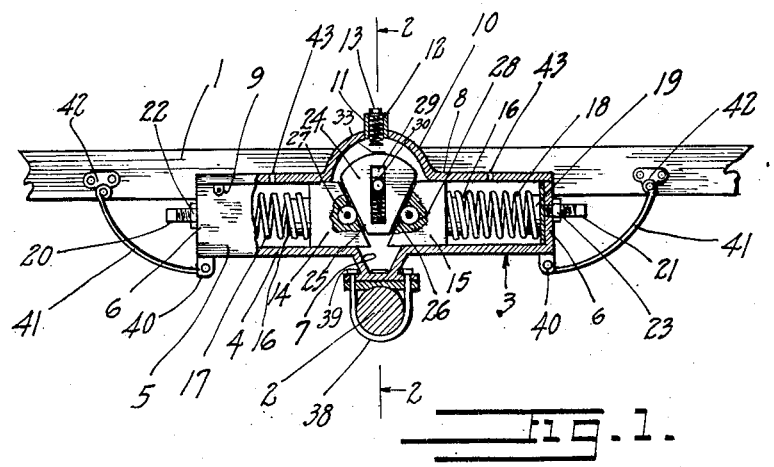
Figure 2:
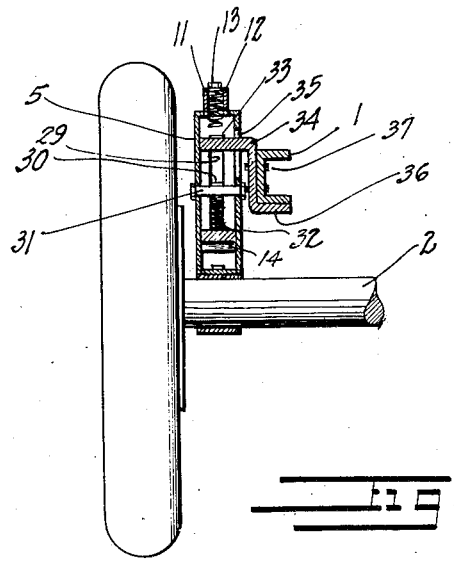

My invention is illustrated in the accompanying drawings, forming part of this application, in which Figure 1 is a side elevation of my device as applied to a vehicle, a portion thereof being broken away, and Figure 2 is a section substantially along the line 2—2 of Figure 1.

In carrying out my invention, I make use of a vehicle having a frame 1 and an axle 2. I provide a housing 3 having a bottom portion or wall 4, side walls 5, and end walls 6. The bottom wall 4 is provided with a downwardly extending receptacle 7, the side walls of which are tapered upwardly and outwardly.

A cover 8 is disposed upon the housing 3 and is rigidly secured in place by any suitable means, such as machine screws 9. The cover 8 is provided with an arcuate-shaped head portion 10 having a tubular integral retaining portion 11. A compression spring 12 is movably disposed in the portion 11 and is held in place by a screw 13.

Pressure blocks 14 and 15 are movably disposed in the housing 3 upon each side of the receptacle 7 and are provided with reduced circular portions 16. Compression springs 17 and 18 have their inner ends disposed concentric with the reduced circular portions 16 and their outer ends disposed adjacent movable blocks or plates 19. The plates 19 are disposed normally adjacent the end walls 6 within the housing 3, see Figure 1.

Means is provided for varying the tension of the springs 17 and 18. This means consists of set screws 20 and 21 which have square heads and which are receivable in threaded openings in the ends 6 of the housing. Lock nuts 22 and 23 are disposed upon the set screws 20 and 21.

A tapered cam 24 having cam surfaces 25 and 26 is movably disposed in the housing 3. The pressure blocks 14 and 15 are also provided with tapered surfaces adjacent the tapered surfaces of the tapered cam 24. The pressure blocks 14 and 15 are provided with rollers 27 and 28 which are rotatably disposed therein and arranged to extend a short distance beyond the tapered surfaces thereof. The tapered cam 24 is provided with an elongated opening 29 in which a block 30 is movably disposed. The block 30 is held against movement with respect to the housing by means of a bolt 31. A spring 32 is disposed in the elongated opening 29 between the block 30 and the lower extremity of the opening. A pad 33 is disposed upon the upper extremity of the tapered cam in alignment with the spring 12.

The tapered cam is provided with a supporting arm 34 which extends through an elongated slot 35 in the housing 3 and extends downwardly and inwardly as shown in Figure 2—thus providing a shoulder 36. The shoulder 36 is arranged to extend beneath the frame 1 and the supporting arm 34 is rigidly secured to the frame by any suitable means, such as bolts 37.

The housing 3 is provided with outwardly extending flanges 38 through which the ends of a U-bolt 39 extend—thus providing means for rigidly securing the housing 3 to the axle 2. The housing is also provided with lugs 40 which are integral with the bottom wall 4 adjacent the end walls 6. Leaf springs 41 have their lower ends pivotally secured to the lugs 40 and their upper ends pivotally secured to the frame 1 by means of brackets 42.

From the foregoing description of the various parts of the device, the operation thereof may be readily understood. When a vibrating movement is applied to the axle 2, as when the vehicle is moving over a rough road or pavement, the pressure is applied to the springs 17 and 18. Let us assume that the axle 2 is forced upwardly suddenly as when the wheels of the vehicle strike an obstacle. The tapered cam 24 is held substantially stationary by the frame 1. Therefore, the pressure caused by the upward movement of the axle causes the housing 3 to move upwardly and the rollers 27 and 28 to ride along the tapered surfaces 25 and 26 of the tapered cam. During this upward movement of the housing and the parts contained therein, the pressure blocks 14 and 15 will be forced outwardly against the tension of the springs 17 and 18. It is obvious therefore that when pressure is applied to the axle 2, the pressure is transmitted to the end walls 6 through the pressure blocks 14 and 15 and the springs 17 and 18. This obviates the jar of the frame and places the pressure upon unmovable parts. The spring 32 is adapted to aid in stopping the movement of the housing 3 after it has passed upwardly an unusual distance.

When the housing 3 again moves downwardly, due to the pressure of the springs 17 and 18, the housing will be held against an abrupt stop by the spring 12 which is arranged to contact with the pad 33. Furthermore, the springs 41 tend to hold the housing 3 against unusual displacement. The operator may vary the tension of the springs 17 and 18 by loosening the lock nuts 22 and 23 and adjusting the set screws 20 and 21 so as to move the plates 19 inwardly or outwardly. After the springs 17 and 18 have been adjusted to the desired tension, they may be locked in this adjusted position by again moving the lock nuts 22 and 23 in their locked positions.

Oil ports 43 are provided in the cover 8, whereby a lubricant may be admitted to the housing. In this manner, the housing may be kept relatively filled with a lubricant so that the parts contained therein will not wear due to friction. The receptacle 7 is disposed beneath the tapered cam 24 and is arranged to receive a portion of the lubricant, whereby the tapered cam will be lubricated as it passes into and out of the receptacle.

The frame is prevented from rocking with respect to the axle due to the fact that the housing 3 is rigidly secured to the axle and that the tapered cam is only slidably disposed in the housing. Furthermore, the frame may be disposed relatively close to the axle 2 as provided by the supporting arm 34 which extends downwardly and inwardly for supporting the frame.

I claim:

1. A device of the type described comprising a housing, means for securing the housing to an axle of a vehicle having a frame, said housing being movable with respect to the frame, a cam member movably disposed within the housing and connected with the frame, cam blocks movably disposed within the housing and transversely slidable with respect to the movement of the housing, compression spring members disposed within the housing and in engagement with the cam blocks for resisting the movement of the cam blocks with respect to the housing, and spring means carried by the housing and adapted for engaging the cam member for resisting a downward movement of the housing with respect to the cam member.

2. A device of the type described comprising a housing, means for securing the housing the housing to an axle of a vehicle having a frame, said housing being movable with respect to the frame, a cam member movably disposed within the housing and connected with the frame, cam blocks movably disposed within the housing and transversely slidable with respect to the movement of the housing, compression spring members disposed within the housing and in engagement with the cam blocks for resisting the movement of the cam blocks with respect to the housing, spring means carried by the housing and adapted for engaging the cam member for resisting a downward movement of the housing with respect to the cam member, and spring means carried by the cam member and connected with a bearing member extending through the cam member and fixedly connected with the housing, said spring means being adapted for providing additional resistance to a downward movement of the housing with respect to the cam member.

3. A device of the type described comprising a housing, means for securing the housing to an axle of a vehicle having a frame, said housing being movable with respect to the frame, a cam member movably disposed within the housing and connected with the frame, cam blocks movably disposed within the housing and transversely slidable with respect to the movement of the housing, compression spring members disposed within the housing and in engagement with the cam blocks for resisting the movement of the cam blocks with respect to the housing, and spring means carried by the housing and cam member for counteracting the force exerted by the compression spring members, thereby resisting the downward movement of the housing with respect to the cam member.

Signed at Chicago, in the county of Cook, and State of Illinois, this 16th day of February, A. D. 1928.

JOSEPH E. WOOD.